United States Patent
Pita-Gil et al.

(10) Patent No.: US 10,987,979 B2
(45) Date of Patent: Apr. 27, 2021

(54) PROCESSING OF AUTOMOBILE DATA ON A SMARTPHONE

(71) Applicant: RENAULT s.a.s., Boulogne-Billancourt (FR)

(72) Inventors: Guillermo Pita-Gil, Montigny-le-Bretonneux (FR); Francois Desnoyer, Paris (FR); Guillaume Martin, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/376,889

(22) PCT Filed: Feb. 5, 2013

(86) PCT No.: PCT/EP2013/052243
§ 371 (c)(1),
(2) Date: Sep. 15, 2014

(87) PCT Pub. No.: WO2013/117545
PCT Pub. Date: Aug. 15, 2013

(65) Prior Publication Data
US 2015/0012170 A1     Jan. 8, 2015

(30) Foreign Application Priority Data

Feb. 6, 2012   (FR) ...................................... 1251090

(51) Int. Cl.
*B60C 23/02*     (2006.01)
*B60C 23/04*     (2006.01)
(Continued)

(52) U.S. Cl.
CPC ...... *B60C 23/0455* (2013.01); *B60C 23/0479* (2013.01); *B60K 28/06* (2013.01);
(Continued)

(58) Field of Classification Search
None
See application file for complete search history.

(56) References Cited

U.S. PATENT DOCUMENTS 6,448,892 B1   9/2002   Delaporte
6,535,116 B1   3/2003   Zhou
(Continued)

FOREIGN PATENT DOCUMENTS

JP    2004-196077    7/2004
JP    2005-219548    8/2005
WO    2011/147893   12/2011

OTHER PUBLICATIONS

International Search Report dated Mar. 5, 2013, in PCT/EP13/052243, filed Feb. 5, 2013.
(Continued)

*Primary Examiner* — John Olszewski
*Assistant Examiner* — Gerrad A Foster
(74) *Attorney, Agent, or Firm* — Oblon, McClelland, Maier & Neustadt, L.L.P.

(57) ABSTRACT

A device for determining an operating state of an automobile from automobile data available on a CAN network of the vehicle, the device including a computer for mathematically processing the data to determine the operating state of the vehicle. The computer is hosted in a smartphone, a specific application for processing the data using the computer is implemented in the smartphone, recovery of the data from the CAN by the smartphone is carried out via a wired or wireless link, and the smartphone displays, via a graphical interface thereof, the operating state of the vehicle.

6 Claims, 2 Drawing Sheets

(51) Int. Cl.
*H04L 29/08* (2006.01)
*G07C 5/08* (2006.01)
*B60K 28/06* (2006.01)
*G07C 5/00* (2006.01)
*G08B 21/06* (2006.01)

(52) U.S. Cl.
CPC ............ *G07C 5/008* (2013.01); *G07C 5/0808*
(2013.01); *H04L 67/125* (2013.01); ***H04L
67/36*** (2013.01); *B60W 2540/22* (2013.01);
*G07C 2205/02* (2013.01); *G08B 21/06*
(2013.01)

(56) References Cited

U.S. PATENT DOCUMENTS

| | | |
|---|---|---|
| 2005/0278079 A1 | 12/2005 | Maguire |
| 2006/0103513 A1 | 5/2006 | Ihara et al. |
| 2007/0222617 A1 | 9/2007 | Chai et al. |
| 2008/0043824 A1* | 2/2008 | Jacobs .................... H03F 3/217 375/220 |
| 2009/0265489 A1 | 10/2009 | Replogle et al. |

OTHER PUBLICATIONS

French Search Report dated Oct. 3, 2012 in French Patent Application No. 1251090 filed Feb. 6, 2012.
Office Action dated Nov. 8, 2016 in corresponding Japanese Application Serial No. 2014-555253 (with Short Summary of Reasons for Rejection in English).

\* cited by examiner

PROCESSING OF AUTOMOBILE DATA ON A SMARTPHONE

The present invention relates to the processing of various parameters of a motor vehicle by a mobile device of the smartphone type ['ordiphone' in French], and more particularly data processing for determining an operating state of the vehicle from said parameters.

The term 'ordiphone', according to the official terminology in France (see text No. 70 of the Official Journal of the French Republic No. 0300 of 27 Dec. 2009) is a contraction of the terms 'ordinateur' [computer] and 'téléphone' [telephone] and designates the new generations of phone, also commonly called 'smartphones', also enabling access to the Internet, taking photos, videos, etc. all generally aided by a fairly large color screen and good resolution.

Motor vehicles are generally equipped with a screen, or graphical interface (dashboard), which should enable the display, through indicators, pictograms or specific dials, of different functions and states of the vehicle, chiefly including warning functions in the event of malfunctioning of the vehicle or of one of its components or subassembly.

The multiplicity of driver warning and safety devices has required the use of specific pictograms which, given the space available on the dashboard, are not always very comprehensible and/or appear to be insufficient by themselves for the driver to have a good understanding of the state of the system and its operation.

For example, in the context of a system for monitoring tire pressure, the dashboard may comprise an indicator that lights up when one of the wheels is flat. However, it is necessary to have a more sophisticated (and therefore expensive and complex) dashboard for indicating which wheel is flat. It may also seem useful to have the actual or estimated pressure of each tire, which requires a specific graphical interface, or at least a rational arrangement of most dashboards.

Furthermore, onboard computers in motor vehicles have limited computing capabilities optimized for current uses, but which prove insufficient for some driving support applications requiring image processing or complex signal processing.

In addition, some systems or warning devices may become, by regulation, mandatory, which may require the adaptation of the existing vehicle fleet, which is difficult and expensive.

For example, the European Parliament has adopted a resolution requiring from automakers the serial assembly of systems for measuring tire pressure (TPMS 'Tire Pressure Monitoring System') in new vehicles from November 2012. In this context, car owners might well wish to equip their old vehicle with the system, especially considering the safety aspect and the expected gain in consumption, intrinsic to this requirement of driving with the vehicle's tires inflated to the recommended pressure.

More generally, in the case of vehicles that are not equipped with computing means and onboard software dedicated to computing values for generating warnings, it is necessary to bring the vehicle to a dealership for installing new safety warning devices.

In the context of this TPMS regulation, the use is known of the ESP (Electronic Stability Program) computer for improving the directional control of a motor vehicle, an in-car computer, for hosting the function of computing tire pressure. Onboard calculations in vehicles generate costly developments essentially related to the fact that the computer is fixed point (for price reasons), which complicates the integration of a control law which has been developed in floating point. Furthermore, when the desired function is complex, it requires significant computing capabilities that increase the cost of the computers.

This cost can quickly increase when the associated software has to be modified during the life of the vehicle. Furthermore, the graphical interface, which is that of the dashboard of the vehicle, is limited.

This aspect seems all the more worthwhile to address when the signals needed for computing and generating warnings are already present on the vehicle's onboard network or CAN (Controller Area Network) bus.

Moreover, the provision of 'automobile' specific applications, forming a vehicle 'enhanced dashboard', is already known on smartphones. For example, there are applications retransmitting the speed of the vehicle on a smartphone, or the pressure of each tire. The tire pressure measurement is performed with one pressure sensor per wheel which retransmits the information on the CAN network of the vehicle. This information is then transmitted onto the smartphone's screen.

Thus, such applications only relay the information available on the CAN bus of the vehicle.

The present invention aims to address the problems previously mentioned and thus provides a device for determining an operating state of a motor vehicle from the vehicle data available on the CAN network of the vehicle, said device comprising a computer for mathematically processing said data with a view to determining the operating state of the vehicle, characterized in that the computer is hosted by a smartphone, a specific application for data processing by said computer being implemented in the smartphone, retrieval of the data by the smartphone from the CAN being performed via a wired or wireless link, and in that the smartphone offers a display, via the graphical interface thereof, of the operating state of the vehicle.

The principle of the invention is therefore based mainly on a delegation of computing means to the smartphone, on the basis of the vehicle parameters available on the CAN network.

Preferably, the device comprises a warning level linked to a specific operating state of the vehicle, the device activating, when the warning level is reached, a sound and/or light signal on the graphical interface of the smartphone.

According to a preferred implementation of the invention, the operating state of the vehicle is the pressure of each tire.

Accordingly, it is particularly advantageous to activate the warning level when the specific operating state is a tire pressure below a threshold value.

According to a further implementation of the present invention, the device uses at least one datum originating from one of the smartphone sensors, in order to determine an operating state of the vehicle.

Advantageously, the datum originating from one of the smartphone sensors, is the state of hypovigilance obtained from digital processing of the substantially full-face shots of the driver, the images being provided by the smartphone camera.

The present invention is also aimed at a method of determining the operating state of a vehicle characterized in that it comprises the following steps:
  implementing an application for computing the operating state of a vehicle according to data on a smartphone,
  connecting the smartphone to the CAN network of the vehicle,
  transferring vehicle operation CAN data to the smartphone, calculating the operating state of the vehicle from the data via the application, displaying the operating state of the vehicle on the smartphone screen.

Advantageously, the operating state of the vehicle is the pressure of a tire.

The present invention will be better understood with the aid of the following description, with reference to the accompanying figures, in which.

According to the illustrative example of the present invention, the computing capabilities of a smartphone are used for monitoring tire pressure by an indirect method by processing the signal corresponding to the speed of the wheels.

Such a method is, for example, described in the application FR11-52290 where the variation in the dynamic radius of the tires is used as an indicator of pressure variation, this variation in the radius being obtained from the speed of the wheels. This document will be advantageously referred to for the other parameters needed for computing tire pressure.

Figure 1:
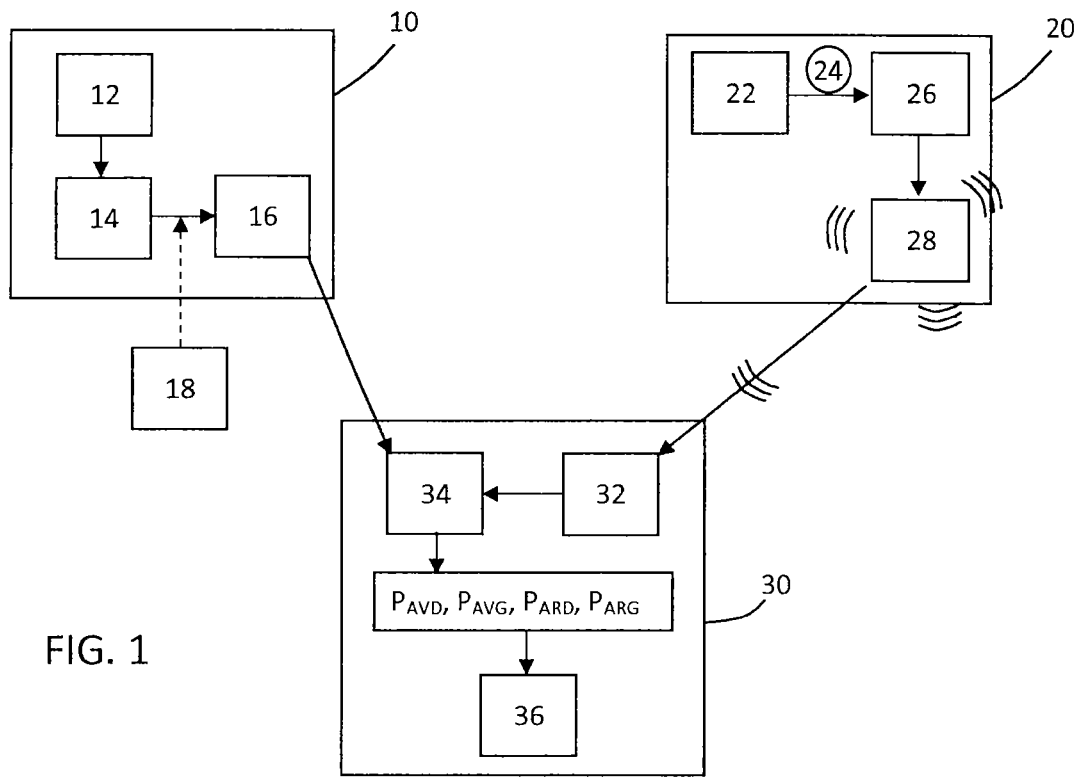
FIG. 1 is a block diagram of the implementation of the present invention.

FIG. 1 schematically shows the process of implementing a device for determining an operating state of a motor vehicle, in this case determining tire pressure according to the present invention. This process comprises three subsets:
- a subset 10 corresponding to the preparation of the computer program by the proposed method and its implementation on the smartphone,
- a subset 20 corresponding to the exchange of CAN data from the vehicle to the smartphone,
- a subset 30 corresponding to the processing and display of the results.

Thus, a method of computing 12 the tire pressure leads to developing a model and writing a program in a programming language of the Matlab/Simulink type.

This program is integrated into a dedicated specific application 14, in different languages corresponding to the different programming languages of smartphones. The application 14 is then implemented in a smartphone, e.g. by downloading, through a specific action of a user 18, and thus constitutes a program 16 in the smartphone.

The subset 20 comprises, from the vehicle 22, the acquisition of operating data 24 from the vehicle and their transmission on the CAN network 26 of the vehicle. A means of transmitting 28 these data, e.g. via a Bluetooth® type of wireless technology, from the CAN network, completes this subset. A specific protocol can be used for transferring the data to the subset 30.

The latter thus comprises a receiver 32 of the signals originating from the transmitter 28. The data relating to these signals are used by a computer 34 using the program 16 and the method of computing 12 for the preparation of the pressure state $P_{AVD}$, $P_{AVG}$, $P_{ARD}$, $P_{ARG}$ of the four tires, and the reproduction of this computation on the graphical interface 36 of the smartphone.

Figure 2:
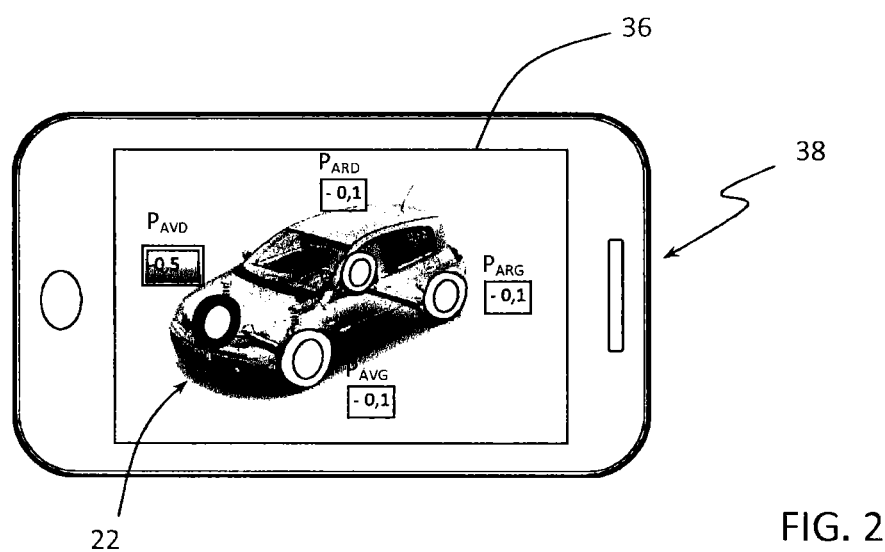
FIG. 2 is a schematic view of a smartphone provided with the present invention.
Figure 3:
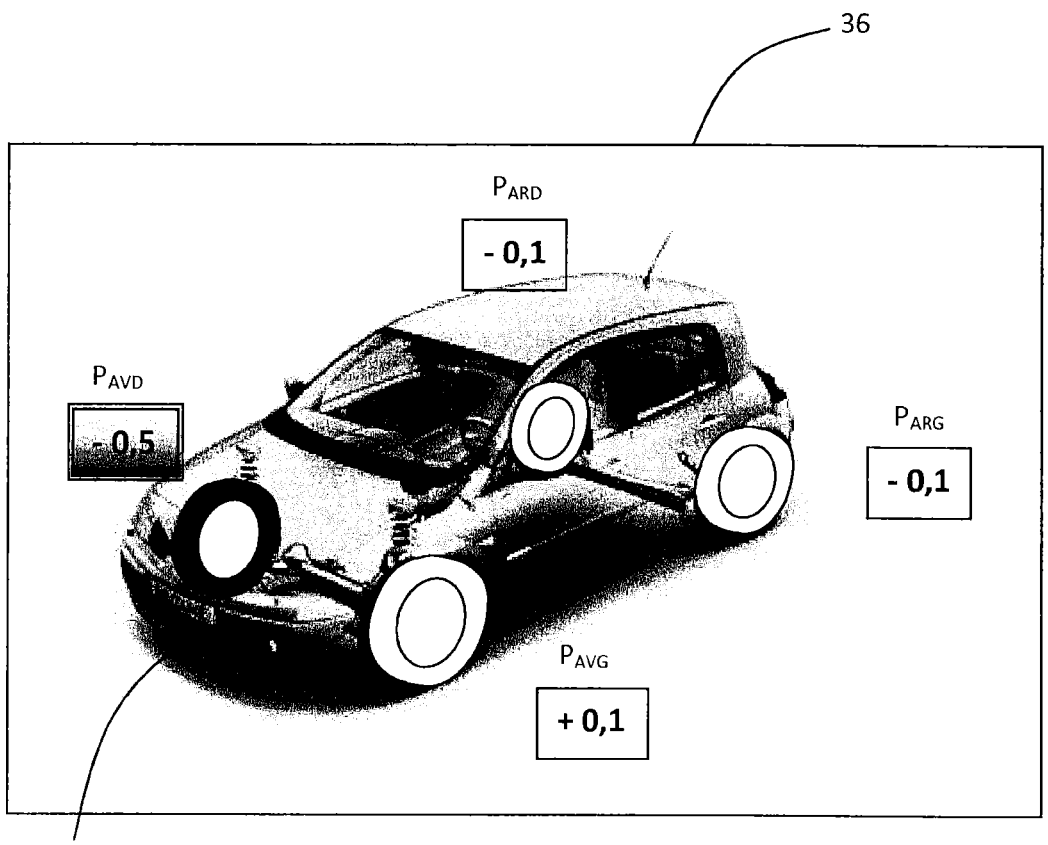
FIG. 3 is an enlarged representation of the graphical interface of the smartphone for the present invention.

As shown in FIGS. 2 and 3, the graphical interface 36 of a smartphone 38 shows the vehicle 22 in a three-quarter schematic view, in which the depiction of the wheels has been highlighted, indicating the difference between the computed pressure and the recommended pressure.

As depicted in these figures, a contrasting depiction of the wheels having an insufficient pressure may be provided. In this case, the right front wheel shows insufficient pressure since it is 0.5 bar below the recommended level.

The contrasting depiction of the wheel, and a specific display of the relative pressure level, enables the driver or whoever is looking at the smartphone screen to be notified of this insufficiency.

It may be useful to supplement this display with a sound signal. Other display variants may be implemented for warning the driver, by taking advantage of the screen display and animation facilities of smartphones. A message may also be provided according to the nature and occurrence of this difference: puncture or simply insufficient pressure.

The present invention is not limited to the computation of tire pressure by indirect method, and is applicable to many other determinations of an operating state or parameter of the vehicle, for which the computation of the warning is transferred onto the smartphone's processor or computer.

In particular computations of vehicle behavior, path and path compliance may be cited.

Furthermore, the smartphone can provide, via the sensors that it comprises, additional information that can be used to improve the calculations or to provide other functions. This may involve, for example, the use of a gyroscope, an accelerometer, or even a built-in camera as a front-view display, which can be used for anti-collision detection or lane change detection by coupling this information with the vehicle data.

The use of the smartphone camera, when it has one, in a predefined position (fixed support on the windshield, for example) may also can take advantage of the computing power of the smartphone's processor for image processing.

In this context, monitoring the alertness state of the driver may be envisaged, by directing the camera toward the driver, an image processing application being used to determine a parameter specific to the alertness state of the driver. This parameter may be based on the number and/or duration of eyelid blinks, head movements, etc.

This parameter can then be correlated and associated with operating parameters of the vehicle, such as speed, steering angles, etc. for determining whether the driver should be alerted to any hypovigilance detected.

In this connection, the expression 'operating state of the vehicle' must then be understood as including the ability of the driver to drive the vehicle, at least with regard to his/her estimated alertness state, this ability thus forming an integral part of the operating parameters of the vehicle.

Furthermore, image processing by a processor located in the immediate vicinity of the sensor representing the camera can be used to optimize the computation times.

As a variant, the transmission of information from the CAN network of the vehicle up to the smartphone can be achieved via a wired connection.

Thus, via this new interaction between the vehicle and the smartphone, the present invention can be used to improve:
- onboard applications on the vehicle by enhancing their capabilities and enabling them to use the sensors and computing and display capabilities of mobile terminals that are smartphones,
- smartphone applications by providing high content applications based on the optimum use of the data from the onboard network of the vehicle,
- the installation of driving aid applications on a general consumer mobile device of the smartphone type interconnected with the onboard network of the vehicle,
- applications using smartphone sensors and for which it is relevant to the locate computation near the sensors.

Furthermore, the present invention also enables not just the driver, but also the passengers in the vehicle, to have an intelligent mobile interface with the onboard systems.

Through the present invention, it is then possible to have available, on a person's smartphone, an application for calculating and retrieving of an operating state of a vehicle, which may not be his/her own vehicle, such as, for example, the state of inflation of the tires. It is sufficient that the person and his/her smartphone are on board a vehicle whereof the CAN has the information needed for the computation. For example, it is thus possible for a passenger sitting in the third row of a vehicle to know the state of inflation of the tires of the vehicle in which he/she is sitting.

The invention claimed is:

1. A device for determining a pressure of each tire of a motor vehicle from vehicle CAN network data including a parameter directly measured on said vehicle and available on a CAN network of the vehicle, the device comprising:
   a computer for mathematical processing of the vehicle data to indirectly determine the pressure of each tire of the vehicle, wherein the computer is hosted by a smartphone;
   a specific software application for data processing by the computer being implemented in the smartphone, and including a model of a mathematical relationship between the parameter and said tire pressure, for indirectly determining said tire pressure;
   a wired or wireless link implemented by the smartphone and configured to retrieve the vehicle CAN network data by the smartphone from the CAN network via the wired or wireless link; and
   a display implemented on the smartphone which displays, via a graphical interface thereof, the pressure of each tire indirectly determined by the computer based on said model.

2. The device as claimed in claim 1, further comprising a warning level associated with a specific state of the pressure of each tire of the vehicle, the device activating, when the warning level is reached, a sound and/or a light signal, on the graphical interface of the smartphone.

3. The device as claimed in claim 2, wherein the specific state of the pressure of each tire activating the warning level is a tire pressure below a threshold value.

4. The device as claimed in claim 1, wherein the computer uses at least one datum originating from a sensor of the smartphone, to determine an operating state of the vehicle.

5. The device as claimed in claim 4, wherein the datum originating from a sensor of the smartphone is a state of hypovigilance determined from digital processing of a substantially full-face image shot of the driver, which is provided by a camera of the smartphone.

6. A method for determining a pressure of a tire of a vehicle, comprising:
   implementing, on a processor of a smartphone, an application including a model of a mathematical relationship between a parameter directly measured on the vehicle to said pressure of a tire of the vehicle;
   connecting the smartphone to a CAN network of the vehicle;
   transferring said parameter as an item of vehicle operation CAN data to the smartphone;
   indirectly computing the pressure of a tire of the vehicle, from the parameter as an item of vehicle operation CAN data and the model of the application based on said pressure of the tire indirectly computed; and
   displaying an operating state of the vehicle on a screen of the smartphone.

* * * * *